United States Patent
Duan et al.

(10) Patent No.: US 11,261,283 B2
(45) Date of Patent: Mar. 1, 2022

(54) POLYURETHANE CEMENTING WIPER PLUGS

(71) Applicants: Ping Duan, Cypress, TX (US); Anil Sadana, Houston, TX (US)

(72) Inventors: Ping Duan, Cypress, TX (US); Anil Sadana, Houston, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 259 days.

(21) Appl. No.: 16/400,400

(22) Filed: May 1, 2019

(65) Prior Publication Data

US 2020/0347175 A1  Nov. 5, 2020

(51) Int. Cl.
| | |
|---|---|
| *C08G 18/10* | (2006.01) |
| *E21B 41/00* | (2006.01) |
| *E21B 33/14* | (2006.01) |
| *E21B 37/02* | (2006.01) |
| *C08G 18/42* | (2006.01) |
| *C08G 18/32* | (2006.01) |

(Continued)

(52) U.S. Cl.
CPC ......... *C08G 18/10* (2013.01); *C08G 18/3206* (2013.01); *C08G 18/3215* (2013.01); *C08G 18/3243* (2013.01); *C08G 18/4263* (2013.01); *C08G 18/48* (2013.01); *C08G 18/664* (2013.01); *C08G 18/6644* (2013.01); *C08G 18/6651* (2013.01); *C08G 18/6685* (2013.01); *C08G 18/7614* (2013.01); *C08G 18/7671* (2013.01); *E21B 33/14* (2013.01); *E21B 37/02* (2013.01); *E21B 41/00* (2013.01)

(58) Field of Classification Search
CPC ............... C08G 18/10; C08G 18/3206; C08G 18/3215; C08G 18/3243; C08G 18/4263; C08G 18/48; C08G 18/664; C08G 18/6644; C08G 18/6651; C08G 18/6685; C08G 18/7614; C08G 18/7671; E21B 33/14; E21B 37/02; E21B 41/00
See application file for complete search history.

(56) References Cited

U.S. PATENT DOCUMENTS

| | | | |
|---|---|---|---|
| 4,378,838 A | * | 4/1983 | Ogden .................... E21B 33/16 166/153 |
| 5,390,736 A | | 2/1995 | Budde |

(Continued)

FOREIGN PATENT DOCUMENTS

WO  2014186111 A2  11/2014

OTHER PUBLICATIONS

Foy et al., "Synthesis of Linear Aliphatic Polycarbonate Macroglycols Using Dimethylcarbonate," Journal of Applied Polymer Science, 2009, vol. 111 pp. 217-227.

(Continued)

*Primary Examiner* — Crystal J Miller
(74) *Attorney, Agent, or Firm* — Cantor Colburn LLP

(57) ABSTRACT

A method for operation in wellbore, the method comprises: pumping a fluid barrier into a wellbore through a tubular, the fluid barrier being operable to separate a cement slurry from a second fluid; the fluid barrier comprising a polyurethane member derived from a polyurethane forming composition comprising a para-phenylene diisocyanate terminated polycarbonate prepolymer and an aromatic diol.

14 Claims, 6 Drawing Sheets

(51) Int. Cl.
*C08G 18/66* (2006.01)
*C08G 18/76* (2006.01)
*C08G 18/48* (2006.01)

(56) References Cited

U.S. PATENT DOCUMENTS

| | | | |
|---|---|---|---|
| 5,433,270 A | 7/1995 | Lafleur | |
| 9,677,372 B2 | 6/2017 | Smith et al. | |
| 2005/0256288 A1 | 11/2005 | Zhu et al. | |
| 2010/0266348 A1 | 10/2010 | Boulkertous et al. | |
| 2014/0342110 A1* | 11/2014 | Zhu | C08G 18/7614 428/36.9 |
| 2015/0353768 A1 | 12/2015 | Yamada et al. | |
| 2016/0115759 A1* | 4/2016 | Richards | E21B 33/16 166/378 |
| 2018/0016411 A1* | 1/2018 | Wang | C08G 18/10 |

OTHER PUBLICATIONS

International Search Report for International Application No. PCT/US2020/024848, International Filing Date Mar. 26, 2020, dated Jul. 13, 2020, 3 pages.
Leblanc, Tren "Going the Distance Cemenet Wiper Plug Technology", SPE/IADC-184712-MS, The Hague, The Netherlands, Mar. 14-16, 2017 (5 pages).
Martinelli et al., "Addition of Polyurethane to Portland Cement", PDCEM; 6 pages; retrieved Oct. 2018.
SealBond Technical Data Sheet: MA-252 Water Based Cement Urethane Slurry; Revised Jan. 24, 2013; 3 pages.
Trogus et al. "Studies of Cement Wiper Plugs Suggest Deepwater Standards", SPE/IADC-173066-MS, London, United Kingdom, Mar. 17-19, 2015 (9 pages).
Written Opinion for International Application No. PCT/US2020/024848, International Filing Date Mar. 26, 2020, dated Jul. 13, 2020, 7 pages.

* cited by examiner

POLYURETHANE CEMENTING WIPER PLUGS

BACKGROUND

Zonal isolation with the use of a cement is a common practice in the oil and gas industry. In general, the goal of cementing is to secure a stable and effective seal in a designated location of the wellbore. In other cases, a cementing operation may be used to provide a base for initiating a deviation or kick-off when a directional change in drilling is desired or for temporarily or permanently abandoning a well.

During a cementing operation, cement slurries are often pumped down tubulars know as drill pipes, liners, or casings. The pumped cement slurry displaces a wellbore fluid during placement then hardens forming a sealing barrier. Contamination of the cement slurry with the wellbore fluid can slow or prevent setting. Accordingly, wiper plugs are often used to separate cement slurries from other fluids to reduce contamination and to maintain predictable slurry performance. Because downhole conditions can vary greatly from one wellbore to another, the art would be receptive to alternative wiper plugs, especially those that are effective and durable under challenging downhole conditions.

SUMMARY

A method for operation in wellbore, the method comprising: pumping a fluid barrier into a wellbore through a tubular, the fluid barrier being operable to separate a cement slurry from a second fluid; the fluid barrier comprising a polyurethane member derived from a polyurethane forming composition comprising a para-phenylene diisocyanate terminated polycarbonate prepolymer and an aromatic diol.

A fluid barrier comprising: a wiper plug having a core and a polyurethane member disposed on the core; and a pump downhole plug engaged with the wiper plug, the fluid barrier being operable to separate a cement slurry from a second fluid; wherein the polyurethane member is derived from a polyurethane forming composition comprising a para-phenylene diisocyanate terminated polycarbonate prepolymer and an aromatic diol.

BRIEF DESCRIPTION OF THE DRAWINGS

A description of the figures, which are meant to be exemplary and not limiting, is provided in which.

DETAILED DESCRIPTION

Polyurethanes can be formed by reacting isocyanates with polyols, optionally in the presence of chain extenders and curatives. Depending on the specific reactants used, polyurethane products can have different tensile strength, wear resistance, elasticity, tear strength, chemical resistance, thermal or high temperature stability, and other physical and chemical properties.

The inventors have found that polyurethanes derived from para-phenylene diisocyanate terminated polycarbonate prepolymers and aromatic diols are especially useful as materials for downhole fluid barriers. These polyurethanes are strong and tough with tensile strength greater than 6000 psi and elongation at break great than 400%. These polyurethanes also have excellent tear strength and wear resistance. In addition, these polyurethanes have improved chemical resistance in basic fluids at elevated temperatures compared to other commonly used polyurethanes such as those derived from polyether or polyester polyurethane prepolymers or those cured with aromatic diamines.

Figure 1:
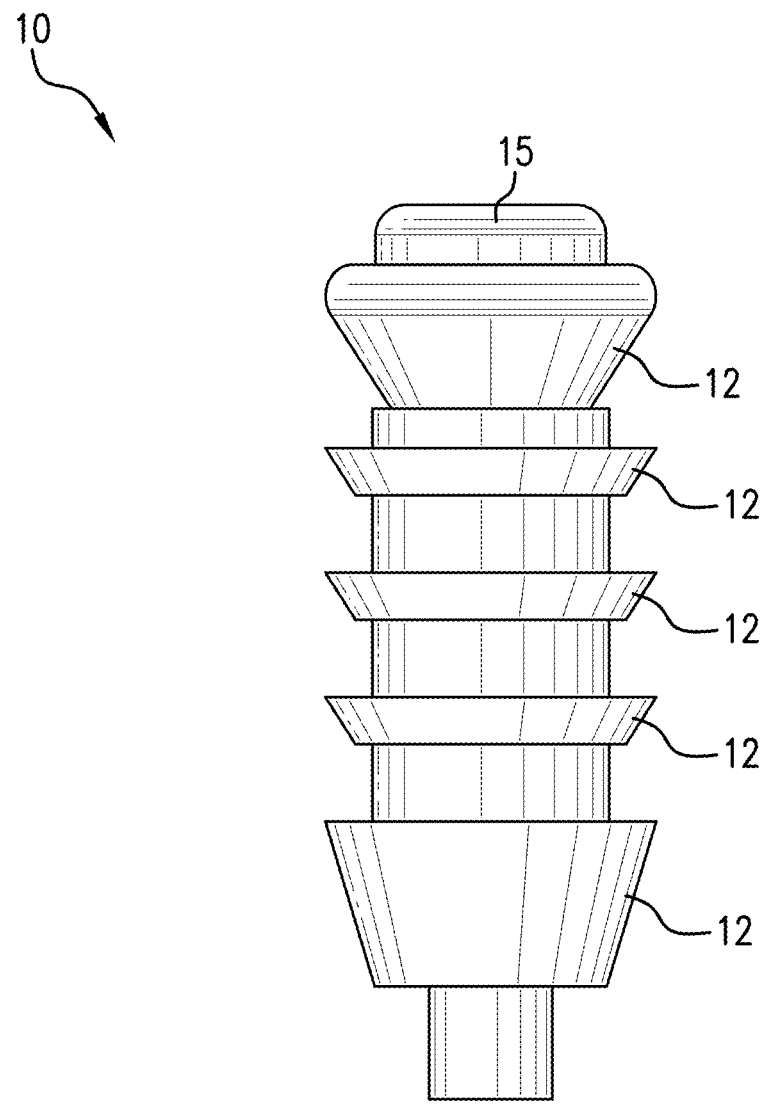
FIG. 1 is a side view of a fluid barrier having a polyurethane member derived from a para-phenylene diisocyanate-terminated polycarbonate polymer and an aromatic diol.

FIG. 1 illustrates a fluid barrier that is operable to separate a cement slurry from a second fluid when pumped into a wellbore. The fluid barrier 10 includes a core 15 and a polyurethane member 12 disposed on the core. The materials for the core of the fluid barrier are known and include metals such as aluminum, polymers, and composites. The polyurethane member is made from a polyurethane forming composition comprising a para-phenylene diisocyanate terminated polycarbonate prepolymer and an aromatic diol.

The para-phenylene diisocyanate (PPDI)-terminated polycarbonate prepolymer has an isocyanate content of about 1 to about 5 wt %, based on the total weight of the para-phenylene diisocyanate terminated polycarbonate prepolymer. The prepolymer also comprises less than 1.0% by weight of free 4,4'-diisocyanato diphenylmethane, based on the total weight of the prepolymer. PPDI-terminated polycarbonate prepolymers can be formed by reacting polycarbonate polyols, for example, those described herein in the context of polycarbonate polyol chain extender, with a stoichiometric excess of para-phenylene diisocyanate. PPDI-terminated polycarbonate prepolymers are commercially available from companies such as LANXESS and Chemtura Corporation. A specific example of the PPDI-terminated polycarbonate is ADIPRENE LFP 8375 from LANXESS.

Preferably, the aromatic diol comprises hydroquinone bis (beta hydroxyethyl) ether. The inventors have found that in order to obtain a polyurethane having balanced tensile strength, tear strength, abrasion resistance, and chemical resistance, the polyurethane forming composition is essentially free of amine curatives or aliphatic curatives. As used herein, "essentially free" means that the polyurethane forming composition comprises less than about 3%, less than about 1 wt %, or less than about 0.5 wt %, less than 0.1 wt %, less than 0.01 wt %, or zero percent of amine curatives or aliphatic curatives known in the art based on the total weight of the polyurethane forming composition. As used herein, "amine curatives" refer to aliphatic or aromatic amines having at least two amine functional groups. Aliphatic curatives can include aliphatic polyols having at least two hydroxyl groups, aliphatic amines having at least two amine functional groups, or other known aliphatic curing agents.

The polyurethane forming composition can further comprise one or more of a chain extender; a crosslinking agent; or a colorant. The chain extender can include a polycarbonate polyol. Polycarbonate polyols can be obtained by reacting a polyol such as a diol with a carbonate precursor such as phosgene, a carbonyl halide, dimethyl carbonate, diphenyl carbonate, or a haloformate. The reaction conditions are known and can be found for example in Journal of Applied Polymer Science, Vol. 111, 217-227 (2009). Examples of the polyols used to make the polycarbonate polyols include, but are not limited to, 1,6-hexanediol, 1,3-propanediol, 1,4-butanediol, 1,5-pentanediol, 1,7-heptanediol, 1,8-octanediol, 1,9-nonanediol, or a combination comprising at least one of the foregoing. Polycarbonate polyols can have a number average molecular weight of about 1,500 to about 3,500 Daltons. Methods of determining the number average molecular weight is described in US 2015/0353768. The polycarbonate polyols can have a hydroxyl value of about 50 to about 60, as measured in accordance with HS K 1557 B. A specific example of the polycarbonate polyol is a diol having a hydroxyl value of 56 and a number average molecular weight of 2000 Daltons. Such a polycarbonate polyol is commercially available as ETERNACOLL PH200D from Ube Chemical Europe S.A.

The polyurethane forming composition may also include crosslinking agents (low molecular weight polyfunctional alcohols or amines) such as trimethylol propane (TMP), triethanolamine (TEA), or N,N,N',N'-tetrakis(2-hydroxypropyl) ethylenediamine. Catalysts, such as amine catalysts (e.g., tertiary amines such as triethylenediamine), organometallic catalysts, trimerization catalysts (e.g., 1,3,5-(tris(3-dimethylamino)propyl)-hexahydro-s-triazine) may also be included in the polyurethane forming composition.

Colorants are not particularly limited. In an embodiment, the colorants are polyol bound colorants available from Milliken Chemical. As used herein, polyol bound means that the colorant has hydroxyl groups or hydroxyl equivalents, which can react with the PPDI-terminated polycarbonate prepolymer during the polymerization reaction to form the polyurethane. These polyol bound colorants are very effective to achieve the desired color at very low concentrations under 0.1-1% by total weight of the polyurethane forming composition. Polyol bound colorants are readily available from Milliken Chemical as REACTIN.

The polyurethane forming composition can contain 100 parts by weight of the para-phenylene diisocyanate terminated polycarbonate prepolymer; about 1 to about 20 parts by weight, about 12 to about 18 parts by weight or about 15 to about 18 parts by weight of the aromatic diol; about 5 to about 10 parts by weight, about 5 to 8 about parts by weight, or about 5 to about 7 parts by weight of the chain extender; about 0.1 to about 1 part by weight, about 0.01 to about 0.1 part by weight, or about 0.1 to about 0.5 part by weight of the crosslinking agent; and about 0.01 to about 0.1 part by weight or about 0.2 to about 0.8 part by weight of the colorant.

In the polyurethane forming composition, the components as well as the amounts thereof are selected such that the equivalent ratio of total —NCO groups relative to total active hydrogen groups is about 1 to about 1.2 or about 1.05 to about 1.1. The active hydrogen groups refer to groups that contain active hydrogen, which can react with isocyanate groups. Active hydrogen groups can be provided by aromatic diols, crosslinking agents, chain extenders, colorants, or a combination comprising at least one of the foregoing. Examples of the active hydrogen groups include hydroxyl groups, amine groups, and the alike.

In an embodiment, the PPDI-terminated polycarbonate prepolymer disclosed herein are free of polyether and polyester units. The polyurethane forming composition can also be free of polyether prepolymers and polyester prepolymers.

The polyurethanes as disclosed herein can have excellent tensile strength. In an embodiment, the polyurethanes have a tensile strength of about 5,000 psi to about 8,000 psi or about 4,000 psi to about 7,000 psi measured according to ASTM D412-16 with a sample thickness of 0.09 inch. The polyurethanes can also have a modulus at 100% of about 800 to about 1500 psi, or about 1,000 to about 1,400 psi, determined in accordance with ASTM D412-16 with a sample thickness of 0.09 inch.

The polyurethanes can have a tear strength of about 400 to about 600 pounds per linear inch (ph) determined in accordance with ASTM D412-16 with a sample thickness of 0.09 inch.

The polyurethanes can have excellent abrasion resistance. When tested in accordance with ASTM D5963-04 (2015), a sample of the polyurethanes having a thickness of 0.09 inch can have a weight loss of less than about 15 wt % or less than about 13 wt %, based on the total weight of the tested sample.

The polyurethanes can have excellent chemical resistance. Articles comprising the polyurethanes disclosed herein are particularly stable in brines that contain KCl, KBr, $CaCl_2$, NaCl, $CaCl_2$, $ZnCl_2$, or a combination comprising at least one of the foregoing. The articles are also stable in basic fluids having a pH of greater than about 9, greater than about 10, or greater than 11, at elevated temperatures such as about 350° F. to about 300° F.

Because of the balanced physical and chemical properties, the polyurethanes as disclosed herein are particularly suitable to make polyurethane members for a fluid barrier such as a cementing wiper plug or a pump down plug. The obtained wiper plugs are wear resistant, strong and tough. They perform, in terms of wiping-efficiency, better than current wiper plugs that are made of commonly used polyether or polyester based polyurethane systems or acrylonitrile butadiene rubbers (NBR rubbers).

To make a polyurethane member, a PPDI-terminated polycarbonate prepolymer is heated to about 80° C. to about 160° C. Other components such as an aromatic diol, and optional chain extenders, a crosslinking agent, or a colorant, or a combination comprising at least one of the foregoing are also heated to a temperature of about 80° C. to about 160° C. The obtained two liquids are then mixed together and poured inside a pre-heated mold to form a polyurethane molded part. An automatic two-component dispenser can be used. The dispenser has two heated tanks to store PPDI-terminated polycarbonate prepolymers and aromatic diols separately. The two liquids are mixed together through a mixing head, then the mixture is poured or pushed inside a mold.

The obtained parts can be further machined or shaped to form polyurethane members for fluid barriers. Machining includes cutting, sawing, ablating, milling, facing, lathing, boring, and the like using, for example, a miller, saw, lathe, router, electric discharge machine, and the like. Alternatively, the polyurethane as disclosed herein can be directly molded to the useful shape by choosing the molds having the desired shape.

Figure 2:
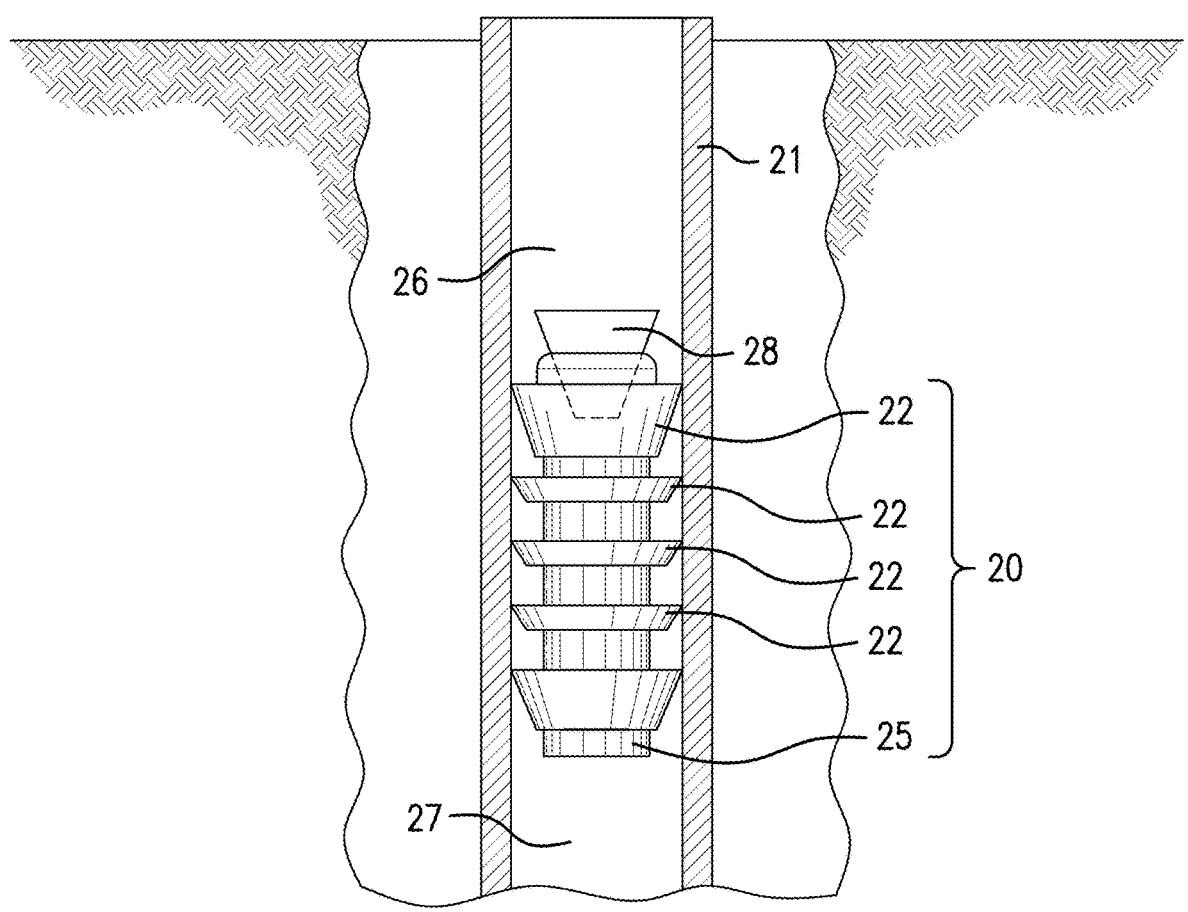
FIG. 2 illustrates a fluid barrier having a wiper plug and a pump down plug engaged with the wiper plug.

Referring to FIG. 2, a fluid barrier can include a wiper plug 20 and a pump down plug 28 engaged with the wiper plug. In use, the wiper plug 20 can be releasably coupled to a tubular member (not shown). The wiper plug 20 can have a hollow core 25 and a polyurethane member 22 disposed on the core. A cementing pump down plug 28 is then inserted into and pushed through a tubing string 21 such as such as a drill pipes, liner, or casing. When the pump down plug 28 engages with the wiper plug 20, for example, latches into the core 25 of the wiper plug 20, the wiper plug 20 is released from the tubular member, and the pump down plug 28 and the wiper plug 20 together act as a single movable fluid barrier to close off the cross section of the tubing string 21 and also serve to wipe the walls of the tubing string while moving toward a landing collar (not shown). The fluid 27 ahead of the fluid barrier can be a drilling fluid, a completion fluid, or another wellbore fluid. The fluid 26 following the fluid barrier can be a cement slurry.

Figure 3:
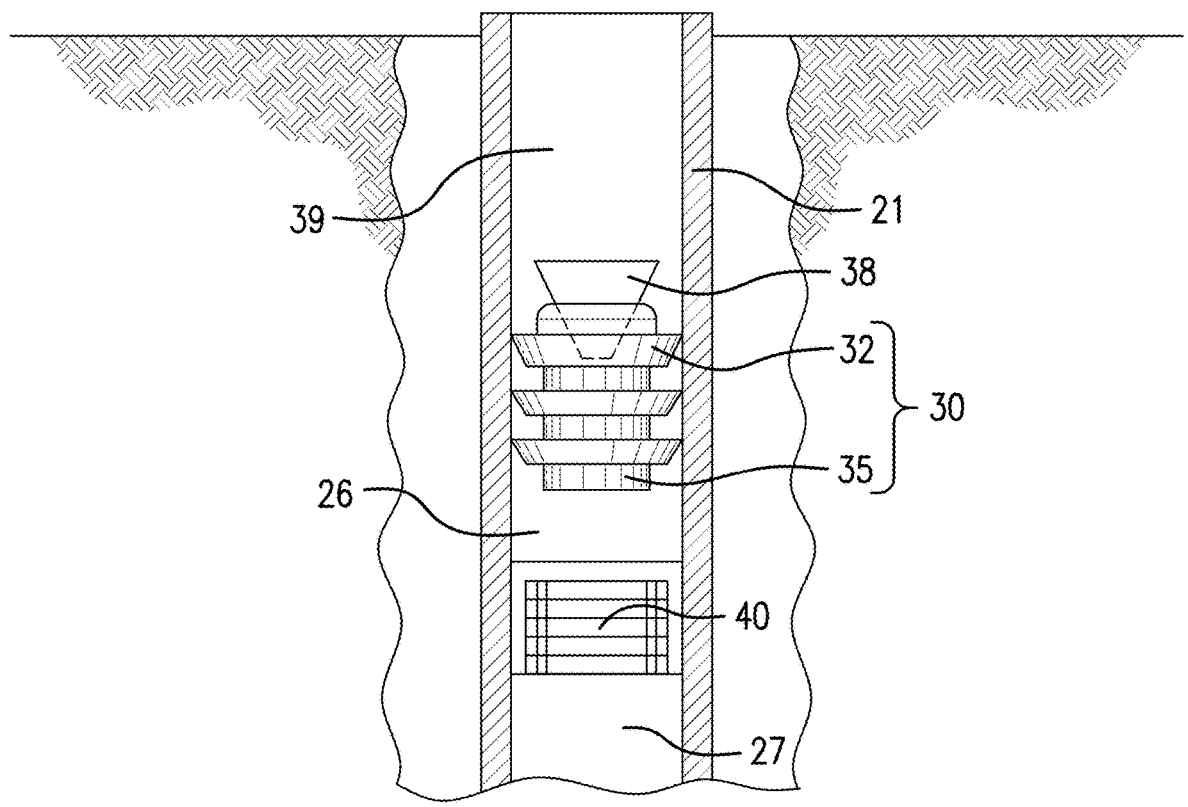
FIG. 3 illustrates the use of a second fluid barrier to separate a cement slurry from another fluid.

More than one wiper plug can be used. Referring to FIG. 3, a second wiper plug 30 having a solid core 35 and a polyurethane member 32 as disclosed herein can also be releasably coupled to the tubular member. When a desired amount of cement slurry 26 has been pumped downhole behind the fluid barrier 40, which is formed by engaging pump down plug 28 with wiper plug 20, a second pump down plug 38 is disposed in the string of tubing 21. When the second pump down plug 38 is engaged with the second wiper plug 30, the second pump down plug 38 and the second wiper plug 30 together providing a single moving, sealing fluid barrier behind the column of the cement slurry 26 in the tubing string 21. Another fluid 39 such as drilling mud or completion fluid can be pumped to provide the driving force on the second pump down plug 38 behind the column of cement slurry. The second fluid barrier can also clean the walls of the tubing string behind the cement slurry.

The polyurethanes having the balanced tensile strength, tear strength, abrasion resistance, and chemical resistance are further illustrated in the following non-limiting examples.

EXAMPLES

The materials used in the Examples are described in Table 1.

TABLE 1

| Material | Chemical Description | Source |
| --- | --- | --- |
| PPDI/PC prepolymer | Para-phenylene diisocyanate terminated polycarbonate prepolymer having % NCO of 3.80 and less than 0.1 wt % free PPDI monomer, available as ADIPRENE LFP R375 | LANXESS |
| TDI/Polyether prepolymer | Toluene diisocyanate terminated polyether prepolymer, available as VIBRATHANE B625 | LANXESS |
| Polycarbonate polyol | Polycarbonate polyol having a hydroxyl value of 56 g KOH/g and a number average molecular weight of 2000, available as ETERNACOLL PH200D | UBE Chemical Europe S.A. |
| BDO | 1,4-butanediol | |
| HQEE | Hydroquinone bis (beta hydroxyethyl) ether, available as Poly-G HQEE | Monument Chemical |
| MCDEA | 4,4'-methylene-bis-(3-chloro-2,6-diethyl)aniline | Sigma-Aldrich |
| MDI | Methylene diphenyl diisocyanate | Sigma-Aldrich |
| TMP | Trimethylolpropane | Sigma-Aldrich |
| Colorant | A polyol bound colorant, available as REACTINT | Milliken |
| PU | Polyurethane based on a polyester polyol, para-phenylene diisocyanate, and 1,4-butanediol, available as URETHHALL TPU | Hallstar |
| NBR #1 | A nitrite rubber based material | Custom Rubber Products Inc. |
| NBR #2 | A nitrite rubber based material | Custom Rubber Products Inc. |

The polyurethane prepolymer was preheated at the temperature at about 100-120° C. Other components such as curatives, chain extender, and colorants were blended and preheated at about 100-120° C., then mixed with the preheated prepolymer. All chemical reactants were stochastically balanced between isocyanate groups from the polyurethane prepolymers, and hydroxyl groups from the curatives, chain extenders, cross-linkers, and colorants. In general, there were about 5~10% excess isocyanate groups over hydroxyl groups based on the molecular equivalents. The reactive mixture was poured into a preheated mold having a cavity of 6"×6"×0.09", then cured. It took about 15-20 hours at about 120° C. to complete the curing process. When curing was completed, the mold was cooled down. After demolding, a finished sample having a size of 6" (width)×6" (length)×0.09" (thickness) was obtained. Various polyurethane compositions derived from components shown in Table 2 were evaluated for tensile strength, tear strength, abrasion resistance, thermal stability, and fluid compatibility. The amounts of the components shown in Table 2 are parts by weight.

TABLE 2

| Components | PCPU #1 | PCPU #2 | PCPU #3 | PCPU #4 |
| --- | --- | --- | --- | --- |
| PPDI/PC prepolymer | 100.00 | 100.00 | 100.00 | 100.00 |
| Polycarbonate polyol | 4.24 | 8.47 | 13.38 | 16.94 |
| HQEE | 7.30 | 6.93 | 6.88 | 6.15 |
| TMP | 0.36 | 0.33 | 0.34 | 0.30 |
| Colorant | 0.05 | 0.05 | 0.05 | 0.05 |

Tensile properties were evaluated in accordance with Standard Test Methods for Vulcanized Rubber and Thermoplastic Elastomers—Tension ASTM D412-16. Tensile strength, tensile elongation, and the modulus are summarized in Table 3 below. Tensile properties from NBR rubbers are also provided for comparison.

TABLE 3

| | Tensile Strength, psi | Elongation, % | Modulus at 100%, psi | Modulus at 200%, psi | Modulus at 300%, psi |
| --- | --- | --- | --- | --- | --- |
| PCPU #1 | 6481.7 | 391.4 | 1275.1 | 2027.7 | 3154.3 |
| PCPU #2 | 6309.2 | 385.5 | 1290.1 | 1925.7 | 2975.1 |
| PCPU #3 | 5767.6 | 443.2 | 1070.3 | 1636.9 | 2362.2 |
| PCPU #4 | 5607.3 | 411.1 | 997.6 | 1566.4 | 2471.2 |
| NBR #1 | 4834.2 | 346.8 | 558.6 | 1998.6 | 4004.6 |
| NBR #2 | 4453.9 | 616.4 | 421.1 | 856.6 | 1496.1 |

The results show that all the tested polyurethanes PCPU #1 to PCPU #4 have better tensile strength and better modulus at 100% as compared to NBR #1 and NBR #2. In addition, PCPU #1-PCPU #4 also have better elongation and modulus at 200% as compared to NBR #2.

Tear Strength

Figure 4:
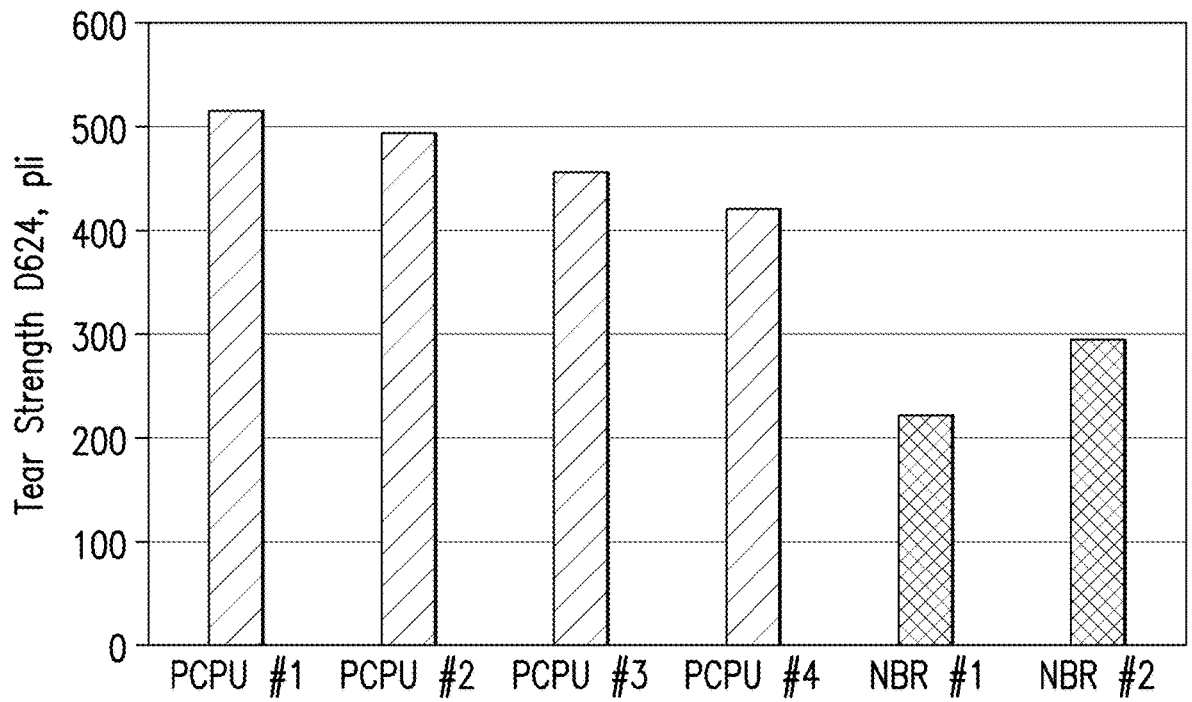
FIG. 4 compares the tear strength of various polyurethane compositions with conventional vulcanized rubbers.

Tear strength was evaluated in accordance with Standard Test Method for Tear Strength of conventional vulcanized rubber and Thermoplastic Elastomers ASTM D412-16. The results are graphically illustrated in FIG. 4. As shown in FIG. 4, PCPU #1-PCPU #4 all have much better tear strength as compared to NBR #1 and NBR #2.

Abrasion Resistance

Figure 5:
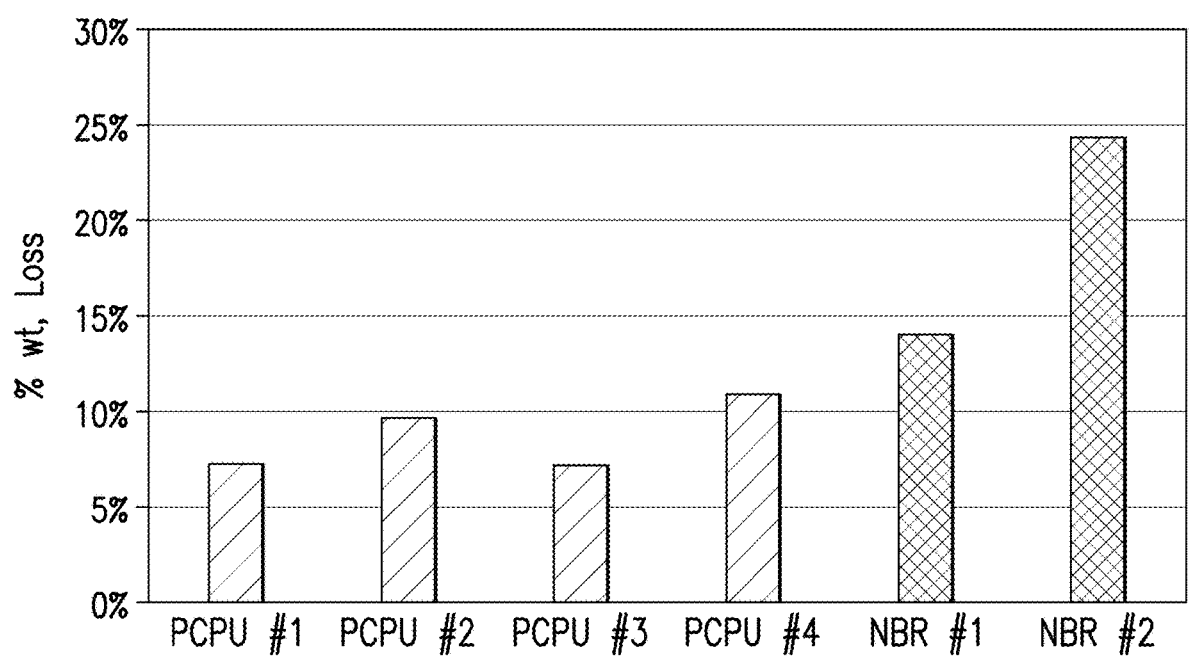
FIG. 5 compares the % weight loss of various polyurethane compositions with conventional vulcanized rubbers after an abrasion test in accordance with ASTM D5963-04 (2015)

Abrasion resistance was evaluated in accordance with Standard Test Method for Rubber Property—Abrasion Resistance (Rotary Drum Abrader) ASTM D5963-04 (2015). The results are graphically illustrated in FIG. 5. A higher % weight loss indicates a worse abrasion resistance. As shown in FIG. 5, PCPU #1-PCPU #4 all have better abrasion resistance as compared to NBR #1 and NBR #2.

Thermal Stability

Figure 6:
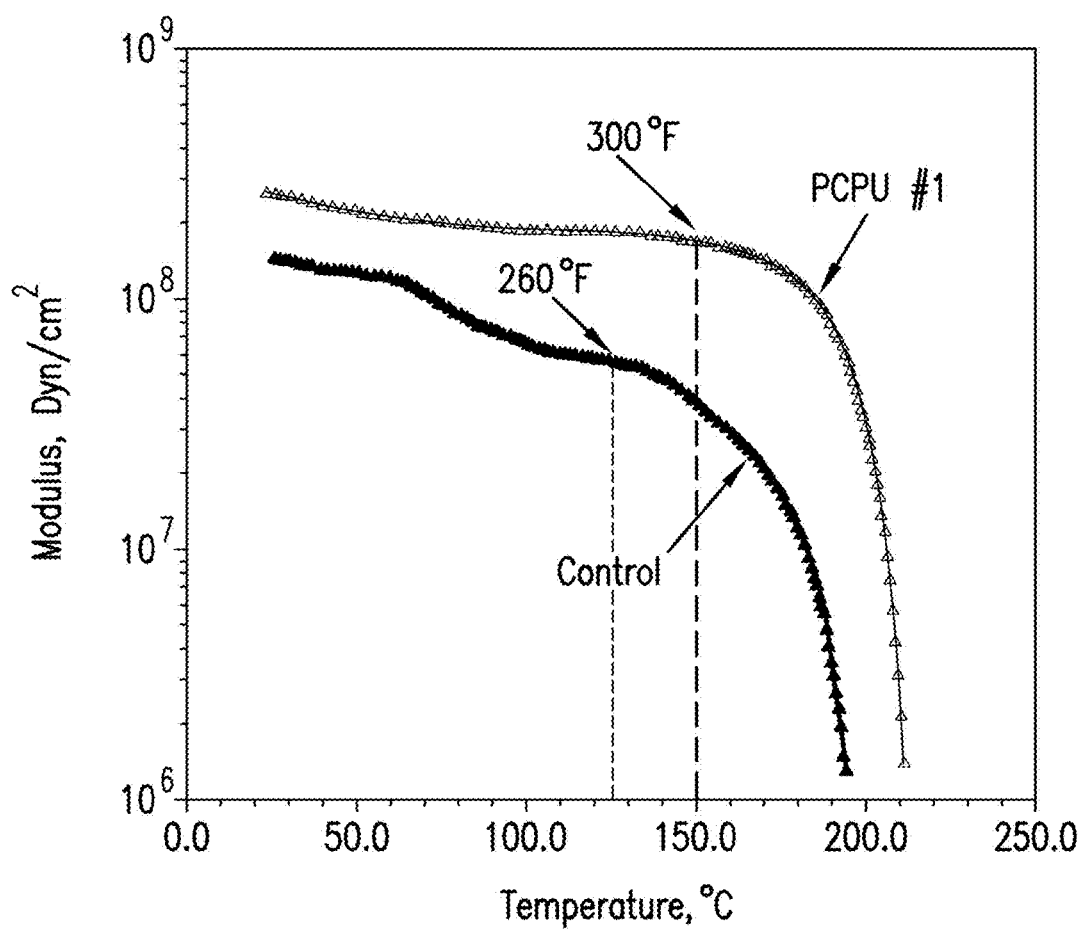
FIG. 6 is a graph of modulus ($dyn/cm^2$) as a function of temperature (° C.) for different polyurethane compositions.

Polycarbonate-PPDI polyurethane samples (PCPU #1) having a size of 6"×6"×0.09" were prepared. The samples were cut into 30 mm long and 3 mm wide strips. Control samples with a size of 30 mm×3 mm×2 mm were cut from Liner Wiper Plug's polyurethane product. The control and polyurethane strip samples were installed on a Dynamic Mechanical Analysis (DMA) instrument commercially available from companies such as TA Instrument. Material modulus was measured and recorded as the temperature increased at a constant rate of 3° C. per minute. The results are graphically illustrated in FIG. 6. As shown in FIG. 6, the polyurethane according to the disclosure is much more stable than the commercially available control sample over a wide temperature range.

Fluid Compatibility

Figure 7A:
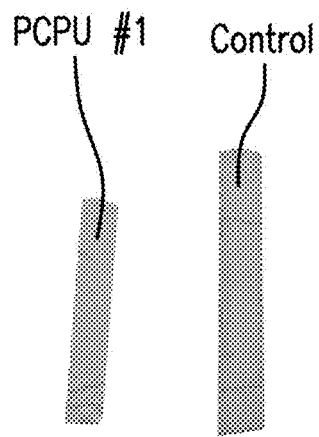
FIG. 7A shows the images of a sample according to the disclosure and a control sample before a fluid compatibility testing.
Figure 7B:
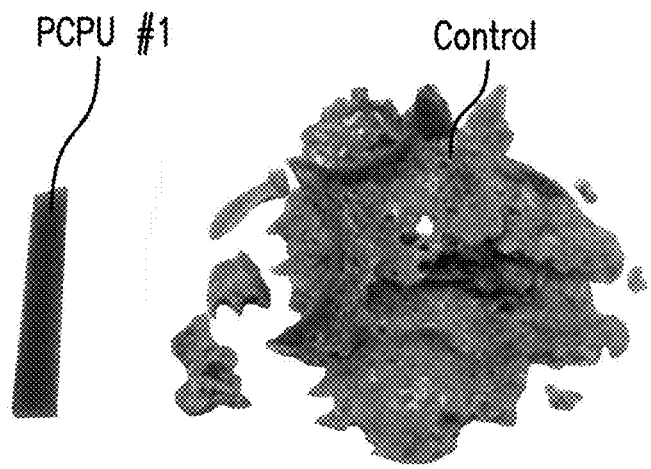
FIG. 7B shows the images of the sample according to the disclosure and the control sample after a fluid compatibility testing.

Polycarbonate-PPDI polyurethane samples (PCPU #1) having a size of 6"×6"×0.09" were prepared. The samples were cut into 30 mm long and 3 mm wide strips. Control samples with a size of 30 mm×3 mm×2 mm were cut from Liner Wiper Plug's polyurethane product. The polyurethane strips were placed a test cell and filled with 3% KCl water solution. The test cell was closed and heated at 275° C. for 24 hours. After the test cell was cooled down, it was opened and, the samples were taken out from the test cell. The images of the samples before and after the aging are shown in FIG. 7A and FIG. 7B. As shown in the figure, a sample according to the disclosure slightly became darker, while the control sample was completely broken into pieces.

Chemical Resistance

Aging tests were conducted for various polyurethane samples in sodium hydroxide aqueous solution having a pH of 13 at 300° F. for 24 hours. The polyurethane formulations are shown in Table 4, and the results are shown in FIG. 8.

TABLE 4

| PCPU #5 (sample 1) | PCPU #6 (Sample 2) | PCPU #7 (Sample 3) | PCPU #8 (Sample 4) | PCPU #9 (Sample 5) |
|---|---|---|---|---|
| PPDI/PC prepolymer HQEE | PPDI/PC prepolymer MCDEA | Polycarbonate Polyol BDO MDI | TDI/Polyetherpre polymer MCDEA | DuPont Hylene TPE |

Figure 8:
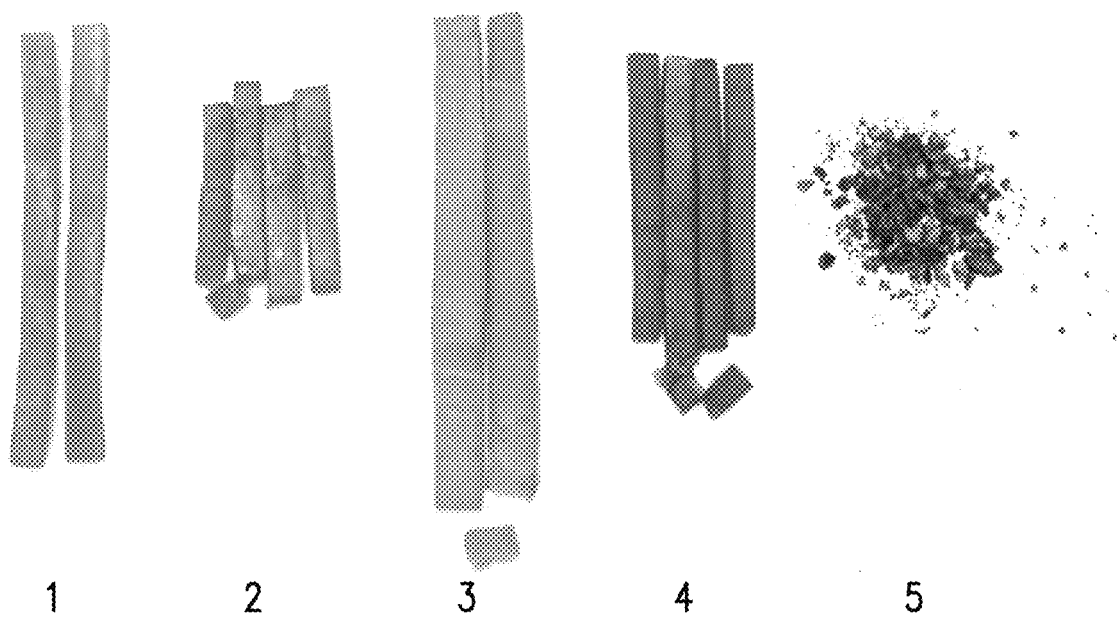
FIG. 8 compares the accelerated aging performance of various polyurethane samples after exposed to sodium hydroxide aqueous solution having a pH of 13 at 300° F. for 24 hours.

As shown in FIG. 8, PCPU #5 (Sample 1) which comprises a polyurethane derived from a PPDI-terminated polycarbonate prepolymer and an aromatic diol has the best chemical resistance compared to samples comprising a polyurethane derived from the same PPDI-terminated polycarbonate prepolymer but cured with an aromatic diamine (PCPU #6, Sample 2) or cured with an aliphatic diol (PCPU #9, Sample 5) as well as samples comprising a polyurethane derived a polyether polyol prepolymer (PCPU #8, sample 4).

Further included in this disclosure are the following specific embodiments, which do not necessarily limit the claims.

Embodiment 1. A method for operation in wellbore, the method comprising: pumping a fluid barrier into a wellbore through a tubular, the fluid barrier being operable to separate a cement slurry from a second fluid; the fluid barrier comprising a polyurethane member derived from a polyurethane forming composition comprising a para-phenylene diisocyanate terminated polycarbonate prepolymer and an aromatic diol.

Embodiment 2. The method as in any prior embodiment, wherein the para-phenylene diisocyanate terminated polycarbonate prepolymer has an isocyanate content of about 1 to about 5 wt %, based on the total weight of the para-phenylene diisocyanate terminated polycarbonate prepolymer.

Embodiment 3. The method as in any prior embodiment, wherein the aromatic diol comprises hydroquinone bis (beta hydroxyethyl) ether.

Embodiment 4. The method as in any prior embodiment, wherein the polyurethane forming composition further comprises one or more of the following: a chain extender; a crosslinking agent; or a colorant.

Embodiment 5. The method as in any prior embodiment, wherein the chain extender is a polycarbonate polyol.

Embodiment 6. The method as in any prior embodiment, wherein the colorant is a polyol bounding colorant.

Embodiment 7. The method as in any prior embodiment, wherein: the para-phenylene diisocyanate terminated polycarbonate prepolymer has an isocyanate content of about 1 to about 5 wt % and comprises less than 1.0% by weight of free 4,4'-diisocyanato diphenylmethane, each based on the total weight of the para-phenylene diisocyanate terminated polycarbonate prepolymer; the aromatic diol comprises hydroquinone bis (beta hydroxyethyl) ether; and the polyurethane forming composition further comprises a chain extender, a crosslinking agent, and a colorant.

Embodiment 8. The method as in any prior embodiment, wherein the polyurethane forming composition comprises: 100 parts by weight of the para-phenylene diisocyanate terminated polycarbonate prepolymer; 1 to 20 parts by weight of the aromatic diol; 5 to 10 parts by weight of the chain extender; 0.1 to 1 part by weight of the crosslinking agent; and 0.01 to 0.1 part by weight of the colorant.

Embodiment 9. The method as in any prior embodiment, wherein the para-phenylene diisocyanate terminated polycarbonate prepolymer has isocyanate groups, and the aromatic diol, the chain extender, the crosslinking agent, and the colorant have active hydrogen groups, and the equivalent ratio of the isocyanate groups relative to the sum of the active hydrogen groups is about 1 to about 1.2.

Embodiment 10. The method as in any prior embodiment, wherein the chain extender is a polycarbonate polyol having a hydroxyl value of about 50 to about 60, as measured in accordance with HS K 1557 B; the colorant is a polyol bounding colorant, and the crosslinking agent is trimethylolpropane.

Embodiment 11. The method as in any prior embodiment, wherein the tubular is a drill pipe, a liner or a casing.

Embodiment 12. The method as in any prior embodiment, wherein the second fluid is a drilling fluid or a completion fluid.

Embodiment 13. The method as in any prior embodiment, wherein the cement slurry is injected after the fluid barrier is pumped into the wellbore through the tubular.

Embodiment 14. The method as in any prior embodiment, further comprising pumping a second fluid barrier into the wellbore through the tubular after the cement slurry is injected to separate the cement slurry from a third fluid.

Embodiment 15. The method as in any prior embodiment, wherein the third fluid is a drilling fluid or a completion fluid.

Embodiment 16. The method as in any prior embodiment, wherein the fluid barrier comprises a wiper plug having a core and the polyurethane member disposed on the core.

Embodiment 17. The method as in any prior embodiment, wherein the fluid barrier further comprises a cement pump down plug engaged with the wiper plug.

Embodiment 18. A fluid barrier comprising: a wiper plug having a core and a polyurethane member disposed on the core; and a pump downhole plug engaged with the wiper plug, the fluid barrier being operable to separate a cement slurry from a second fluid; wherein the polyurethane member is derived from a polyurethane forming composition comprising a para-phenylene diisocyanate terminated polycarbonate prepolymer and an aromatic diol.

Embodiment 19. The fluid barrier as in any prior embodiment, wherein the pump downhole plug comprises a polyurethane and the second derived from a second polyurethane forming composition comprising a second para-phenylene diisocyanate terminated polycarbonate prepolymer and a second aromatic diol.

Embodiment 20. The fluid barrier as in any prior embodiment, wherein the para-phenylene diisocyanate terminated polycarbonate prepolymer and the second para-phenylene diisocyanate terminated polycarbonate prepolymer each independent has an isocyanate content of about 1 to about 5 wt % and comprises less than 1.0% by weight of free 4,4'-diisocyanato diphenylmethane, each based on the total weight of the para-phenylene diisocyanate terminated polycarbonate prepolymer or the second para-phenylene diisocyanate terminated polycarbonate prepolymer; and the aromatic diol and the second aromatic diol each comprises hydroquinone bis (beta hydroxyethyl) ether; and the polyurethane forming composition and the second polyurethane forming composition each independently further comprises a chain extender which is a polycarbonate polyol, a crosslinking agent, and a colorant.

All ranges disclosed herein are inclusive of the endpoints, and the endpoints are independently combinable with each other. As used herein, "combination" is inclusive of blends, mixtures, alloys, reaction products, and the like. The size of the particles refers to the largest dimension of the particles and can be determined by high resolution electron or atomic force microscope technology. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. A method for operation in wellbore, the method comprising:
   pumping a fluid barrier into a wellbore through a tubular, the fluid barrier being operable to separate a cement slurry from a second fluid; the fluid barrier comprising a polyurethane member derived from a polyurethane forming composition comprising: 100 parts by weight of a para-phenylene diisocyanate terminated polycarbonate prepolymer and 1 to 20 parts by weight of an aromatic diol,
   wherein the para-phenylene diisocyanate terminated polycarbonate prepolymer has an isocyanate content of about 1 to about 5 wt % and comprises less than 1.0% by weight of 4,4'-diisocyanato diphenylmethane monomer, each based on the total weight of the para-phenylene diisocyanate terminated polycarbonate prepolymer,
   the aromatic diol comprises hydroquinone bis (beta hydroxyethyl) ether, and
   the polyurethane forming composition further comprises a chain extender which is a polycarbonate polyol; a crosslinking agent; and a colorant,
   wherein a sample of the polyurethane member having a thickness of 0.09 inch has a weight loss of less than about 15 wt %, based on the total weight of the sample when tested in accordance with ASTM D5963-04 (2015); and
   the polyurethane member has improved chemical resistance in a basic fluid at an elevated temperature of about 300° F. to about 350° C. as compared to a reference polyurethane member derived from a polyester polyurethane prepolymer or a reference polyurethane member cured with an aromatic diamine.

2. The method of claim 1, wherein the colorant is a polyol bounding colorant.

3. The method of claim 1, wherein the polyurethane forming composition comprises:
   100 parts by weight of the para-phenylene diisocyanate terminated polycarbonate prepolymer;
   1 to 20 parts by weight of the aromatic diol;
   5 to 10 parts by weight of the chain extender;
   0.1 to 1 part by weight of the crosslinking agent; and
   0.01 to 0.1 part by weight of the colorant.

4. The method of claim 1, wherein the para-phenylene diisocyanate terminated polycarbonate prepolymer has isocyanate groups, and the aromatic diol, the chain extender, the crosslinking agent, and the colorant have active hydrogen groups, and the equivalent ratio of the isocyanate groups relative to the sum of the active hydrogen groups is about 1 to about 1.2.

5. The method of claim 1, wherein the chain extender is a polycarbonate polyol having a hydroxyl value of about 50 to about 60, as measured in accordance with HS K 1557 B; the colorant is a polyol bounding colorant, and the crosslinking agent is trimethylolpropane.

6. The method of claim 1, wherein the tubular is a drill pipe, a liner or a casing.

7. The method of claim 1, wherein the second fluid is a drilling fluid or a completion fluid.

8. The method of claim 1, wherein the cement slurry is injected after the fluid barrier is pumped into the wellbore through the tubular.

9. The method of claim 1, further comprising pumping a second fluid barrier into the wellbore through the tubular after the cement slurry is injected to separate the cement slurry from a third fluid.

10. The method of claim 9, wherein the third fluid is a drilling fluid or a completion fluid.

11. The method of claim 10, wherein the fluid barrier further comprises a cement pump downhole plug engaged with the wiper plug.

12. The method of claim 1, wherein the fluid barrier comprises a wiper plug having a core and the polyurethane member disposed on the core.

13. The method of claim 1, wherein the polyurethane member has improved chemical resistance in a basic fluid at an elevated temperature of about 300° F. to about 350° C. as compared to a reference polyurethane member derived from a polyether polyurethane prepolymer.

14. The method of claim 1, wherein the polyurethane member is stable in a basic fluid having a pH of greater than about 9 at about 300° F. to about 350° C.

* * * * *